No. 783,194. PATENTED FEB. 21, 1905.
A. HARDT.
TWO-CYCLE INTERNAL COMBUSTION ENGINE.
APPLICATION FILED SEPT. 2, 1903.

Witnesses:
Chas Goldberg
Wm P Hammond

Inventor.
Arthur Hardt.
By Knight Bros
Attys.

No. 783,194.

Patented February 21, 1905.

UNITED STATES PATENT OFFICE.

ARTHUR HARDT, OF COLOGNE, GERMANY.

TWO-CYCLE INTERNAL-COMBUSTION ENGINE.

SPECIFICATION forming part of Letters Patent No. 783,194, dated February 21, 1905.

Application filed September 2, 1903. Serial No. 171,579.

*To all whom it may concern:*

Be it known that I, ARTHUR HARDT, a subject of the King of Prussia, Emperor of Germany, whose post-office address is No. 63 Kaiser Friedrichufer, Cologne-on-the-Rhine, Prussia, German Empire, have invented new and useful Improvements in Two-Cycle Internal-Combustion Engines, of which the following is a specification.

This invention relates to an improvement in that kind of internal-combustion engine in which the spent gases are allowed to issue through ports in the cylinder-wall, which are opened toward the end of the working stroke, and the fresh combustible mixture previously compressed in front of the piston is allowed to enter the cylinder through another port opened in a similar manner. As previously constructed such engines suffer from two essential defects. In the first place the fresh charge is liable to ignite in contact with the hot residue remaining in the working cylinder and in the second place a part of the fresh charge escapes through the exhaust-ports and a considerable portion of the spent gases remains in the cylinder. By the present invention a quantity of air is injected into the cylinder before the fresh charge which has been carefully mixed in the pump-cylinder is admitted in such manner that this air forms a layer between the hot spent gases and the combustible charge. The invention also provides for the complete expulsion of the spent gases by arranging the exhaust and admission ports near together in the same side of the cylinder, either side by side or one above the other instead of in opposite sides of the cylinder, as was hitherto usual. In consequence of a special arrangement of a baffle on the piston a fresh charge is compelled to travel through the whole of the cylinder before it could issue therefrom, and thus it sweeps out the whole of the exhaust-gases before it can itself escape.

Figure 1:
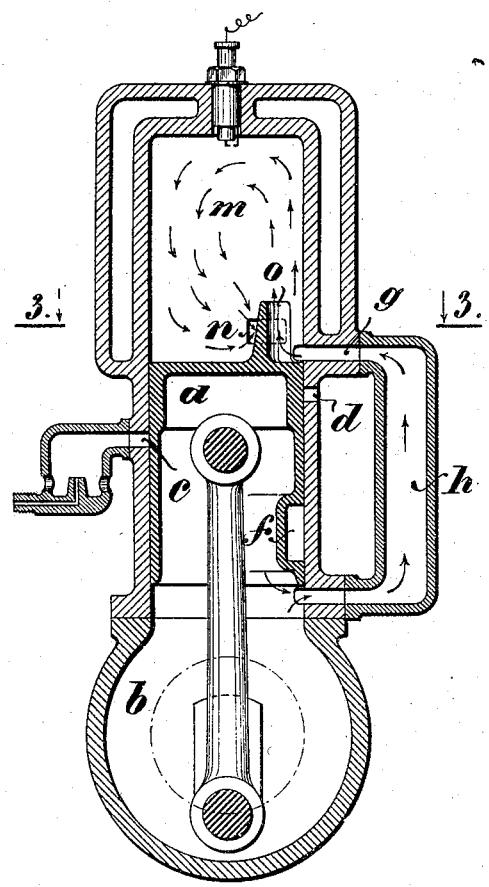
Figure 2:
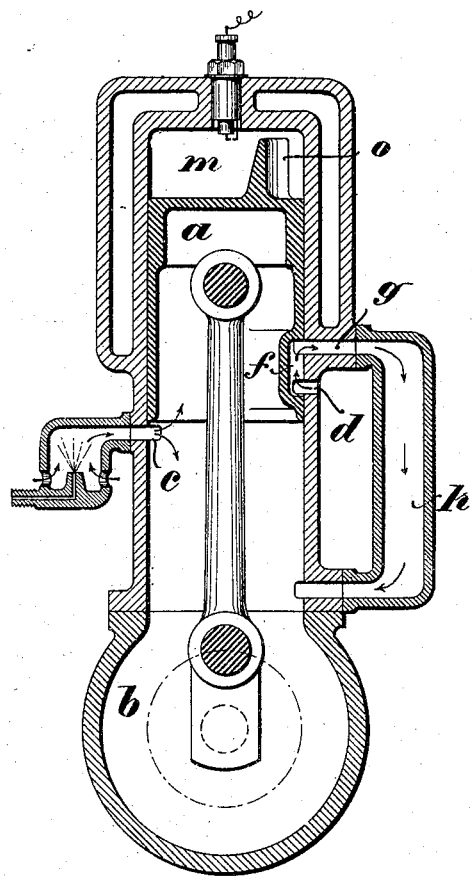
Figure 3:
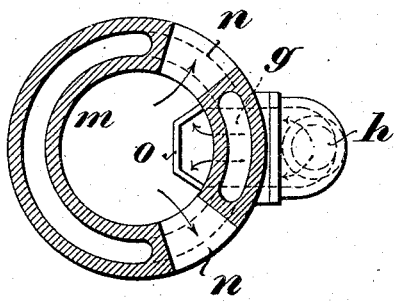

In the accompanying drawings, Figures 1 and 2 are longitudinal sections through an internal-combustion engine constructed according to this invention, the piston in Fig. 1 being at the end of the working stroke and in Fig. 2 at the end of the return stroke. Fig. 3 is a cross-section on the line 3 3 of Fig. 1.

$a$ is a piston working in the cylinder $m$ and is provided with baffle means $o$ for directing the flow of gases to the upper end of the cylinder.

$b$ is a pump-cylinder.

$d$ $g$ are openings in the wall of the cylinder for admitting air to the channel $h$.

In the pump-cylinder $b$ is an admission-port $c$, through which the gas is admitted to the channel $h$ and then forced into the cylinder $m$, where the explosion takes place.

$f$ is a cavity in the piston, communicating with openings $d$ and $g$ in the cylinder-wall.

$n$ is an exhaust-port in the wall of the cylinder $m$ for the escape of the spent gases.

The operation of the engine is as follows: During the return stroke of the piston $a$ there is produced a partial vacuum in the pump-cylinder $b$, and as soon as the port $c$ is opened the entrance of the fresh charge tends to equalize the pressure, and at the same time the cavity $f$ in the piston $a$ makes communication between the opening $d$ and the admission-port $g$, whereupon pure air enters through $d$, $f$, and $g$ into the channel $h$, which connects the working cylinder with the pump-cylinder. In this channel the air meets and to some extent presses back the combustible mixture. When the compressed charge is ignited in the working cylinder and the piston makes its working stroke, the charge in the pump-cylinder is compressed. Toward the end of this stroke the port $n$ is uncovered, and the pressure in the working cylinder is equalized with that of the atmosphere. A little later in the stroke the admission-port $g$ is uncovered, whereupon the fresh charge enters the working cylinder, but is preceded by the air in the channel $h$, so that the combustible mixture does not come in contact with the hot spent gases. The fresh charge impinges on the baffle-plate $o$ on the piston and following the direction indicated by the arrows in Fig. 1 sweeps round the whole cylinder $m$, thus expelling the spent gases and filling the cylinder with fresh mixture.

What I claim as my invention, and desire to secure by Letters Patent of the United States, is—

1. In an internal-combustion engine comprising the working cylinder, pump for forcing explosive mixture into the working cylinder, ports in the cylinder-wall controlled by the piston for the escape of the spent gases, and for admission to the working cylinder of air and explosive mixture, the combination with the working cylinder and the pumping-cylinder, of a channel connecting the said cylinders, port for admitting air into said channel and means for opening the said admission-port at the end of the return stroke of the piston, substantially as and for the purpose described.

2. In an internal-combustion engine comprising a working cylinder, pump for forcing the explosive mixture into the working cylinder, ports in the cylinder-wall controlled by the piston for the escape of the spent gases, and for admission to the working cylinder of air and of explosive mixture, the combination with the working cylinder and the pumping-cylinder, of a channel connecting the said cylinders, port in the cylinder-wall for admitting air into said channel and cavity in the piston adapted to connect at the end of the return stroke the said channel with the air-admission port, substantially as and for the purpose described.

3. In an internal-combustion engine comprising a working cylinder, a pumping-cylinder, a piston in said working cylinder, provided with baffle means, a pump for forcing explosive mixture into said working cylinder; a channel connecting said pumping and working cylinders, an air-admission port, exhaust and inlet ports located at the same side of the cylinder and an air-admission port in the said piston forming a connection between the said exhaust and said channel when the piston enters upon its return stroke.

In testimony whereof I have hereunto set my hand in presence of two subscribing witnesses.

ARTHUR HARDT.

Witnesses:
 CARL W. SCHMITT,
 G. ELSNER.